March 13, 1951        A. HORNIG        2,544,882
LOOM REED
Filed Feb. 12, 1947
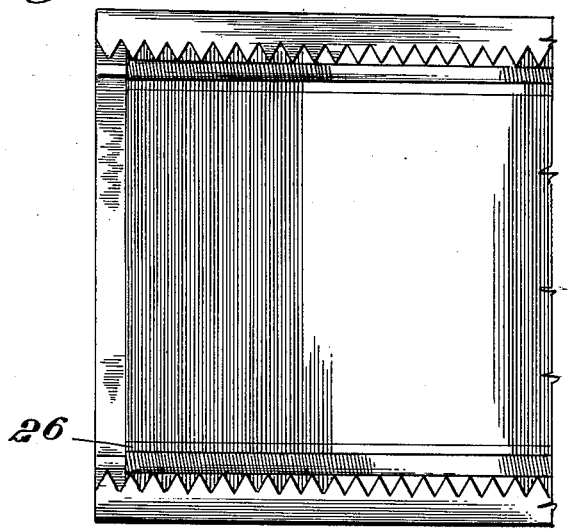
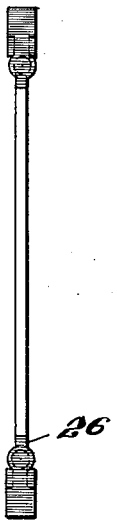
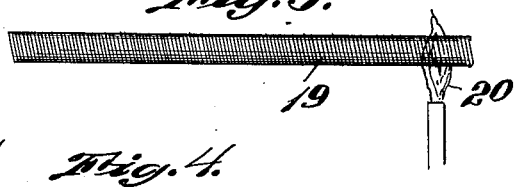
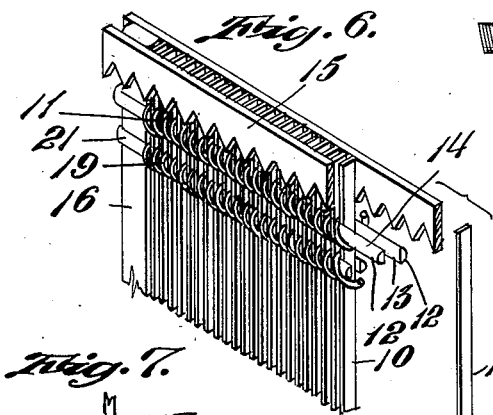
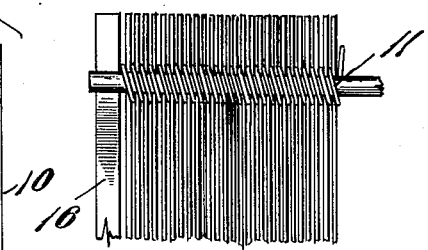
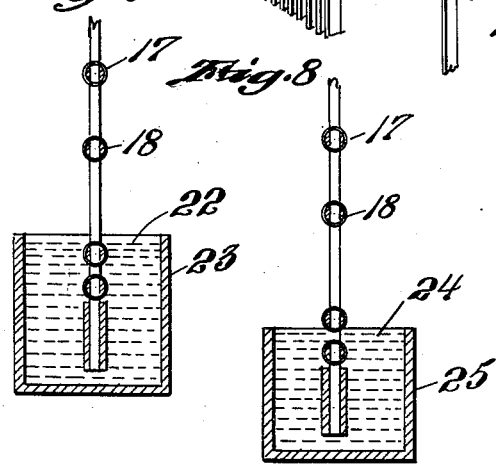
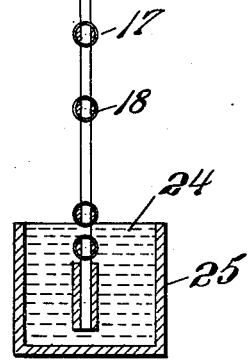
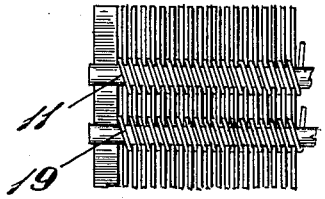
INVENTOR.
*Arno Hornig*
BY *Barlow & Barlow*
ATTORNEYS Patented Mar. 13, 1951

2,544,882

UNITED STATES PATENT OFFICE 2,544,882

LOOM REED

Arno Hornig, Pawtucket, R. I., assignor to Excelsior Loom Reed Works, Inc., a corporation of Rhode Island Application February 12, 1947, Serial No. 728,177

4 Claims. (Cl. 139—192)

This invention relates to an all-metallic loom reed and the method of making the same.

Some loom reeds have their wire dents spaced by being mounted in so-called pitch bars using non-metallic parts. This invention, however, relates to that type of loom reed which has its metal dents spaced with a metallic wire and the ends secured together with solder and the metallic bars covering the ends of the dents. It is usual in such dents that the solder covers only the helically disposed spacing wire against which the dents are rigidly held in contact. The spacing wire forms a very rigid holding of the dents in position, and frequently dents will break at the juncture of the spacing wire and the dents.

An object of this invention is to provide a cushion between the dents adjacent their point of being held by helically disposed wire and thus strengthen the point which has heretofore been found weak.

More specifically, an object of this invention is to locate solder which is softer than the dents between the dents at a point inwardly from their junction with the helically coiled spacing wire to provide a cushion to absorb vibration of the dents.

Another object of this invention is to limit the solder as it extends inwardly from the helically coiled spacing wire so that a straight line will be provided that the appearance of the dent may be made symmetrical.

More specifically this invention has to do with the step of inserting a previously treated coil of wire to which solder will not adhere at a location to limit the adhesion of solder at the location desired.

With these and other objects in view, the invention consists of certain novel features of construction as will be more fully described and particularly pointed out in the appended claims.

In the accompanying drawings:

Fig. 1 is a plan view of a fragmental portion of a reed formed in accordance with this invention;

Fig. 2 is a sectional view through the reed;

Fig. 3 shows the step of charring or oxidizing the helically coiled wire for the purpose of limiting the movement of the solder inwardly of the reed;

Fig. 4 is a plan view illustrating one step in the assembly of the dents and their spacing wire;

Fig. 5 is a view similar to Fig. 4 illustrating the assembly also of the solder limiting member;

Fig. 6 is a perspective view illustrating the assembly of the dents, their spacing wire and wire shown in Fig. 3 also a portion of the plates on the ends of the dents;

Fig. 7 illustrates the dipping of one end of an assembly in a solder flux;

Fig. 8 illustrates the dipping of the reed into a solder bath.

In proceeding with this invention, I assemble the dents, their spacing wire and end plates in a manner which is usual. I then position the charred or oxidized helical coil in the dents by pressing the same in sidewise at a location so that its outer edge will be at the point at which I wish to limit the solder. The whole is then dipped in solder flux and then in solder, and I find that the solder will stop at the outer edge of the charred wire after which the charred wire may be removed, and a straight line formation of solder located inwardly from the tightly bound portions of the dents at their spacing wire is provided.

The dents which are utilized are designated 10, and there is a plurality of these dents such as is usual in a loom reed. The dents are assembled with a spacing wire 11 (see Fig. 4) either by positioning the helical coil and dent laterally one into the other or by winding the coil while positioning the dents between half-round filling bars 12 having a flat inner face 13 and a half-round outer face 14. If the first manner of assembly is utilized, these bars are positioned into the helical coil after the same is positioned between the dents. The metal facing strips 15 are then positioned on either side of the dents at their ends; and, in this case, I utilize the facing strips or wide frame bars with notched edges such as shown in my Patent 2,234,408, dated March 11, 1941. The outer frame members 16 are also provided in their accustomed location. Likewise, in order to maintain these dents in desired position before soldering to secure them, additional spacing wires 17 and 18 are provided at intermediate locations between the bound portions of the dents.

In order to provide solder inwardly from the spacing wires 11 and also limit its movement inwardly, a helical coil 19, such as shown in Fig. 3 having a gauge of wire substantially the same as the gauge of spacing wire, is utilized and this wire is oxidized or charred by means of a flame 20. This wire is then positioned, as shown in Fig. 6, at a location inwardly from the spacing wire 11 adjacent each end of the reed, and the bars 21 are utilized to locate this charred wire in position, and the reed thus assembled is dipped in a solder flux 22 shown in the receptacle 23 and then is dipped in a bath of solder 24 in the receptacle 25. It is immaterial if the charred wire is partially dipped into the solder as this charred wire has the function of limiting the solder so that it will not stick to the charred wire or to the dents at the location embraced by the charred wire, and thus I may provide at the outer edge of the charred wire a very definite line of location of the solder 26 which is provided between the dents and inwardly from the holding and spacing wire 11.

This solder 26 being softer than the dents serves as a cushion which absorbs some of the vibration of the dents making a much stronger reed and one which will not break at the location of the juncture of the dents and spacing wire which rigidly supports the dents.

I claim:

1. A loom reed comprising metal dents, means adjacent the ends of the dents for holding the dents in spaced relation, and solder of a material softer than said dents located between said dents inwardly from any spacing and holding means.

2. A loom reed comprising metal dents, a helically coiled wire adjacent the ends of the dents for holding the dents in spaced relation, and solder of a material softer than said dents located between said dents inwardly from any helically coiled wire spacing and holding means.

3. A loom reed comprising metal dents, means adjacent the ends of the dents for holding the dents in spaced relation, and solder of a material softer than said dents located between said dents inwardly from any spacing and holding means and also about said holding means.

4. A loom reed comprising metal dents, a helically coiled wire adjacent the ends of the dents for holding the dents in spaced relation, and solder of a material softer than said dents located between said dents inwardly from any helically coiled wire spacing and holding means and also about said helically coiled wire holding means.

ARNO HORNIG.

REFERENCES CITED

The following references are of record in the file of this patent:

UNITED STATES PATENTS

| Number | Name | Date |
| --- | --- | --- |
| 1,984,732 | Fish | Dec. 18, 1934 |
| 2,048,001 | Fish | July 21, 1936 |
| 2,107,877 | Schmidt | Feb. 8, 1938 |
| 2,117,909 | Owler | May 17, 1938 |
| 2,234,408 | Hornig | Mar. 11, 1941 |
| 2,447,342 | Kaufmann | Aug. 17, 1948 |